US009194657B1

(12) United States Patent
Ferguson et al.

(10) Patent No.: US 9,194,657 B1
(45) Date of Patent: Nov. 24, 2015

(54) LENS FOR SIGHTING DEVICE

(71) Applicants: Ricky C. Ferguson, Monticello, AR (US); Mary Ellen Ferguson, Monticello, AR (US)

(72) Inventors: Ricky C. Ferguson, Monticello, AR (US); Mary Ellen Ferguson, Monticello, AR (US)

( * ) Notice: Subject to any disclaimer, the term of this patent is extended or adjusted under 35 U.S.C. 154(b) by 0 days.

(21) Appl. No.: 14/638,564

(22) Filed: Mar. 4, 2015

Related U.S. Application Data

(63) Continuation of application No. 14/516,484, filed on Oct. 16, 2014.

(51) Int. Cl.
*F41G 1/467* (2006.01)

(52) U.S. Cl.
CPC ....................................... *F41G 1/467* (2013.01)

(58) Field of Classification Search
CPC .................................. F41G 1/32; F41G 1/467
USPC .............. 33/265; 42/113, 122, 123, 130, 131, 42/132, 144, 145; 124/87, 90; 359/647
See application file for complete search history.

(56) References Cited

U.S. PATENT DOCUMENTS

| | | | |
|---|---|---|---|
| 2,911,724 A * | 11/1959 | Conant | ............................. 42/145 |
| 3,098,303 A * | 7/1963 | Plisk | ................................. 42/145 |
| 3,641,676 A * | 2/1972 | Knutsen et al. | ................... 42/136 |
| 4,195,414 A | 4/1980 | Robinson | |
| 4,220,983 A | 9/1980 | Schroeder | |
| 4,348,716 A | 9/1982 | Storm et al. | |
| 4,533,980 A | 8/1985 | Hayes | |
| 4,542,447 A | 9/1985 | Quakenbush | |
| 4,574,335 A | 3/1986 | Frimer | |
| 4,755,914 A | 7/1988 | Bretl et al. | |
| 5,359,800 A * | 11/1994 | Fisher et al. | ..................... 42/145 |
| 5,693,093 A | 12/1997 | Woffinden et al. | |
| 5,850,700 A * | 12/1998 | Capson et al. | ................... 33/265 |
| 6,058,921 A * | 5/2000 | Lawrence et al. | ................ 124/87 |
| 6,233,836 B1 * | 5/2001 | Uhlmann et al. | ................ 42/145 |
| 6,281,620 B1 | 8/2001 | Yeh | |
| 6,494,604 B2 | 12/2002 | Khoshnood | |
| 6,601,308 B2 | 8/2003 | Khoshnood | |
| 6,634,111 B2 | 10/2003 | LoRocco | |
| 6,802,131 B1 | 10/2004 | Scholz et al. | |
| 7,171,775 B1 * | 2/2007 | Lacorte | ............................ 42/122 |
| 7,373,723 B1 * | 5/2008 | Tupper, Jr. | ....................... 33/265 |
| 7,627,976 B1 * | 12/2009 | Olson | .............................. 42/145 |
| 8,215,024 B1 | 7/2012 | Terzo | |
| 8,272,137 B2 | 9/2012 | Logsdon | |
| 8,713,807 B2 | 5/2014 | LoRocco et al. | |
| 8,752,303 B2 | 6/2014 | Priebe | |
| 8,925,238 B2 * | 1/2015 | Anderson | ........................ 42/132 |

(Continued)

OTHER PUBLICATIONS

Orion Telescopes and Binoculars http://www.telescope.com/Orion-20mm-Illuminated-Centering-Telescope-Eyepiece/p/8239.uts?keyword=illuminated%20eyepiece; http://www.telescope.c, date unknown.
TruGlo 4x32 Crossbow Riflescope, Matte Black Finish with Rings, 1" Tube, Illuminated Reticle \ http://www.adorama.com/TRG8504B3L.html, date unknown.
Burris See the Light http://burrisoptics.com/ar332.html, date unknown.

(Continued)

*Primary Examiner* — R. A. Smith
(74) *Attorney, Agent, or Firm* — Joe D. Calhoun

(57) ABSTRACT

A lens for use in a sighting device, the lens including anti-reflective coating on both primary planar sides, and having an uncoated light-accepting portion of a peripheral edge transmitting light shining thereon within the lens to fluoresce a substance within an indentation or a cavity burred into one side of the lens.

11 Claims, 7 Drawing Sheets

(56) References Cited

U.S. PATENT DOCUMENTS

| | | | |
|---|---|---|---|
| 2007/0028467 A1* | 2/2007 | Bradley et al. | 33/265 |
| 2009/0139100 A1* | 6/2009 | Kingsbury | 33/265 |
| 2012/0151817 A1* | 6/2012 | Howe et al. | 42/132 |
| 2013/0250284 A1 | 9/2013 | Lienhart | |
| 2014/0068955 A1* | 3/2014 | Orlob | 33/228 |

OTHER PUBLICATIONS

Leapers UTG 1.5-6x44 Accushot Rifle Scope, EZ-TAP, Illuminated Mil-Dot Reticle, 1/4 MOA, 30mm Tube, Weaver Rings http://leapers.com/prod_detail.php?mitem=Optics&itemno=SCP3-UM, date unknown.

* cited by examiner

LENS FOR SIGHTING DEVICE

CROSS REFERENCE TO RELATED APPLICATIONS

This application is a continuation of pending U.S. patent application Ser. No. 14/516,484 filed 16 Oct. 2014, and claims the benefit of the filing date thereof.

FEDERALLY SPONSORED RESEARCH AND DEVELOPMENT

Not applicable.

MICROFICHE APPENDIX

Not applicable.

BACKGROUND OF THE INVENTION (1) Field of the Invention

The present disclosure relates to optical or ophthalmic lenses. More particularly, the invention disclosed herein relates to lenses assisting users in gauging distance to a target. One representative example of the use of such lenses is as part of a sighting system for a hunting or target shooting weapon such as an archery bow.

(2) Background of Invention

Some known lenses and sighting devices that are arguably material to patentability include the following.

| U.S. Pat./ application No. | 1st Named Inventor | Date of patent/ Publication |
|---|---|---|
| U.S. Pat. No. 4,195,414 | Robinson | Apr. 1, 1980 |
| U.S. Pat. No. 4,220,983 | Schroeder | 1980 |
| U.S. Pat. No. 4,348,716 | Storm | Sep. 7, 1982 |
| U.S. Pat. No. 4,533,980 | Hayes | Aug. 6, 1985 |
| U.S. Pat. No. 4,542,447 | Quakenbush | Sep. 17, 1985 |
| U.S. Pat. No. 4,574,335 | Frimer | Mar. 4, 1986 |
| U.S. Pat. No. 4,755,914 | Bretl | Jul. 5, 1988 |
| U.S. Pat. No. 5,693,093 | Woffinden | Dec. 2, 1997 |
| U.S. Pat. No. 6,281,620 | Yeh | Aug. 28, 2001 |
| U.S. Pat. No. 6,494,604 | Khoshnood | Dec. 17, 2002 |
| U.S. Pat. No. 6,601,308 | Khoshnood | Aug. 5, 2003 |
| U.S. Pat. No. 6,634,111 | LoRocco | Oct. 21, 2003 |
| U.S. Pat. No. 6,802,131 | Scholz | Oct. 12, 2004 |
| U.S. Pat. No. 8,215,024 | Terzo | Jul. 10, 2012 |
| U.S. Pat. No. 8,272,137 | Logsdon | Sep. 25, 2012 |
| U.S. Pat. No. 8,713,807 | LoRocco | May 6, 2014 |
| U.S. Pat. No. 8,752,303 | Priebe | Jun. 17, 2014 |
| U.S. patent application No. 2013-0250284 | Lienhart | Sep. 26, 2013 |

U.S. Pat. No. 4,195,414 issued to Robinson discloses an electrically lighted, vertically and laterally adjustable sight for an archery bow comprising an elongate battery housing for being mounted lengthwise on an archery bow, and a pair of electrically conductive contact strips carried by the battery housing on a dovetail flange; at least one sight pin holder is mounted on the dovetail flange for selectively adjustable movement along the longitudinal extent of the contact strips. An elongate sight pin having a light emitter on one end is transversely slidably mounted on the sight pin holder, and includes elongate electrical contact strips positioned thereon. A current conductor carried by the sight pin holder operatively interconnects the contact strips on the dovetail flange and the sight pin.

U.S. Pat. No. 5,693,093 issued to Woffinden discloses an ophthalmic lens having a one piece lens body with an integral edge surface includes grooves in the edge surface for reflecting away from the retina of the patient visible light striking the edge surface. This lens design reduces glare seen by the patient caused when incident light contacts the edge surface and is undesirably reflected onto the retina.

U.S. Pat. No. 6,281,620 issued to Yeh discloses a bulb lamp with IR reflectivity including a cap engaged to a bulb composed of a glass lens and a glass reflector, the lens having a positioning dimple in the inner surface of the lens at a centered position to assure alignment of the conductor and filament. Also included is a reflector having an inner surface which is parabolically shaped and coated with an IR reflective material layer.

U.S. Pat. No. 6,601,308 issued to Khoshnood discloses an ambient-light collecting bow sight having a light collecting fiber optic filament of sufficient length to enable extensive winding around a translucent bow sight; one end of the fiber optic filament is attached to a pin or crosshair of the bow sight, thus functioning as a lit targeting pin.

U.S. Pat. No. 6,634,111 issued to LoRocco discloses a multiple-range pin sight for an archery bow, having a plurality of light collecting optical fibers, each having a light-emitting end that serve as a sight point at the end of a pin. An artificial light source projects light toward the light collectors. At least one of the light sources is adjustable between first and second positions, such that the light projects onto one of the light collectors for selectively illuminating a sight dot.

U.S. Pat. No. 8,752,303 issued to Priebe discloses sighting system for a bow, having front and rear sights. The front sight includes at least one sighting element such as a lit sighting dot at the end of a fiber optic pin. The rear sight includes a framed lens having a sighting aperture in the optical center. The sighting aperture may be formed as an opening through the lens in the shape of a straight bore, a conical bore, a countersink, a counterbore, etc. In those embodiments other than the straight bore, the side walls of the sighting aperture, or portions thereof, will be visible to the archer, to more readily allow the archer to locate the sighting aperture during the process of aiming and shooting. The sidewalls of the sighting aperture may be coated or colored to enhance their visibility to the archer. Further, the lens may be configured to provide for the magnification of objects viewed through the lens.

U.S. Patent Application No 2013-0250284 filed by Lienhart discloses automated auto-collimation alignment of a telescope of a surveying instrument. The telescope defines an optical axis perpendicular to a reflective surface of an auto-collimation target, such as a coated plane mirror. Alignment is performed by a method that includes aligning the telescope with the auto-collimation target and illuminating a reticle in the telescope. The auto-collimation target and the illuminated reticle reflected by the reflective surface, or the illuminated reticle, are acquired using an image acquisition device in the telescope or a second telescope. The reticle center in the image is determined. The horizontal and vertical distances of the reticle center are determined from the optical axis of the telescope in the image.

Leupold Optics has a number of scopes having lenses with illuminated reticles, one of which is a single dot at the center of a circle. Literature obtained from the internet (such as Leopold.com) describes lead-free glass lenses, rather than polycarbonate. Each lens surface is coated to minimize reflection and maximize light transmission therethrough. There is no mention of edge polishing.

Orion Telescopes and Binoculars has a website that describes an eyepiece with an illuminated reticle (crosshair or grid) for sighting. The crosshairs of the reticle eyepiece are usually etched on a thin, flat optical window located at the eyepiece's focal plane. A built-in diopter mechanism allows the reticle to be focused. The lens is glass, fully coated on all air-to-glass surfaces. An illumination source positioned at the edge of the etched window lights up the reticle. The best illumination source is a red light-emitting diode, or LED. (See http://www.telescope.com/Orion-20 mm-Illuminated-Centering-Telescope-Eyepiece/p/8239.uts?keyword=illuminated %20eyepiece; http://www.telescope.com/Articles/Equipment/Accessories/Illuminated-Reticle-Eyepieces/pc/9/c/192/sc/196/p/99804.uts.)

There is a website for the TruGlo 4×32 Crossbow Riflescope, Matte Black Finish with Rings, 1" Tube, Illuminated Reticle (http://www.adorama.com/TRG8504B3L.html) which describes a riflescope with illuminated reticle rings. The Xbow riflescope has special range finding and trajectory compensating reticle with dual color illuminated. The TruGlo tactical riflescope comes with an adjustable rheostat for brightness control. This riflescope also has fully coated lenses.

The webpage located at http://burrisoptics.com/ar332.html discloses the Burris AR-332 scope with 3× magnification plus the ballistic CQ reticle. The black reticle is etched directly onto the prism with red and green light illumination available with the turn of a dial.

The Leapers UTG 1.5-6×44 Accushot Rifle Scope has an illuminated mil-dot reticle; one version has 36-color illumination capability. Leapers' True Strength scope includes Emerald-coated optics (95% light transmission) and illumination enhancement red-green-black) in dual-color mode and 36 colors in multi-color mode. If illumination is not used, the reticle will be black.

None of these references expressly discloses a polycarbonate lens with anti-reflective coating on both the concave and convex sides, and having an uncoated light-accepting portion of a peripheral edge transmitting light shining thereon within the lens to fluoresce a UV-cured poly monomer within a bell-shaped cavity burred into the concave side of the lens at its optical and geometric center point.

BRIEF SUMMARY OF THE INVENTION

In most general terms, the invention disclosed herein comprises a lens for a sighting device assisted by a light source, said lens comprising opposing forward and rearward planar sides, a peripheral edge and an optical center area; both sides have anti-reflective coating deposited thereon, and one of said sides includes an indentation at said optical center area which receives a substance transmitting a glow upon (or immediately after) exposure to light, preferably shown onto said peripheral edge. The peripheral edge may have an essentially planar face which is essentially perpendicular to the sides (where the light is directed onto said edge), and/or the peripheral edge may be polished where the light is directed onto the edge. Preferably, the optical center area of the lens is the geometric center as well. The substance is preferably fluorescent, and preferably fluoresced by light from the light source.

The invention disclosed herein may also comprise a combination of the lens and the substance, or a combination of the lens and the substance and the light source; alternatively, the disclosed invention may comprise a combination of the lens, the substance, the light source and the sighting scope housing, for attachment to a weapon or other apparatus needing sighting.

BRIEF DESCRIPTION OF FIGURES OF THE DRAWINGS

FIG. 7 depicts a rear elevation view of a representative sample of a 3-reticle range-gauging version of the lens.

Figure 1:
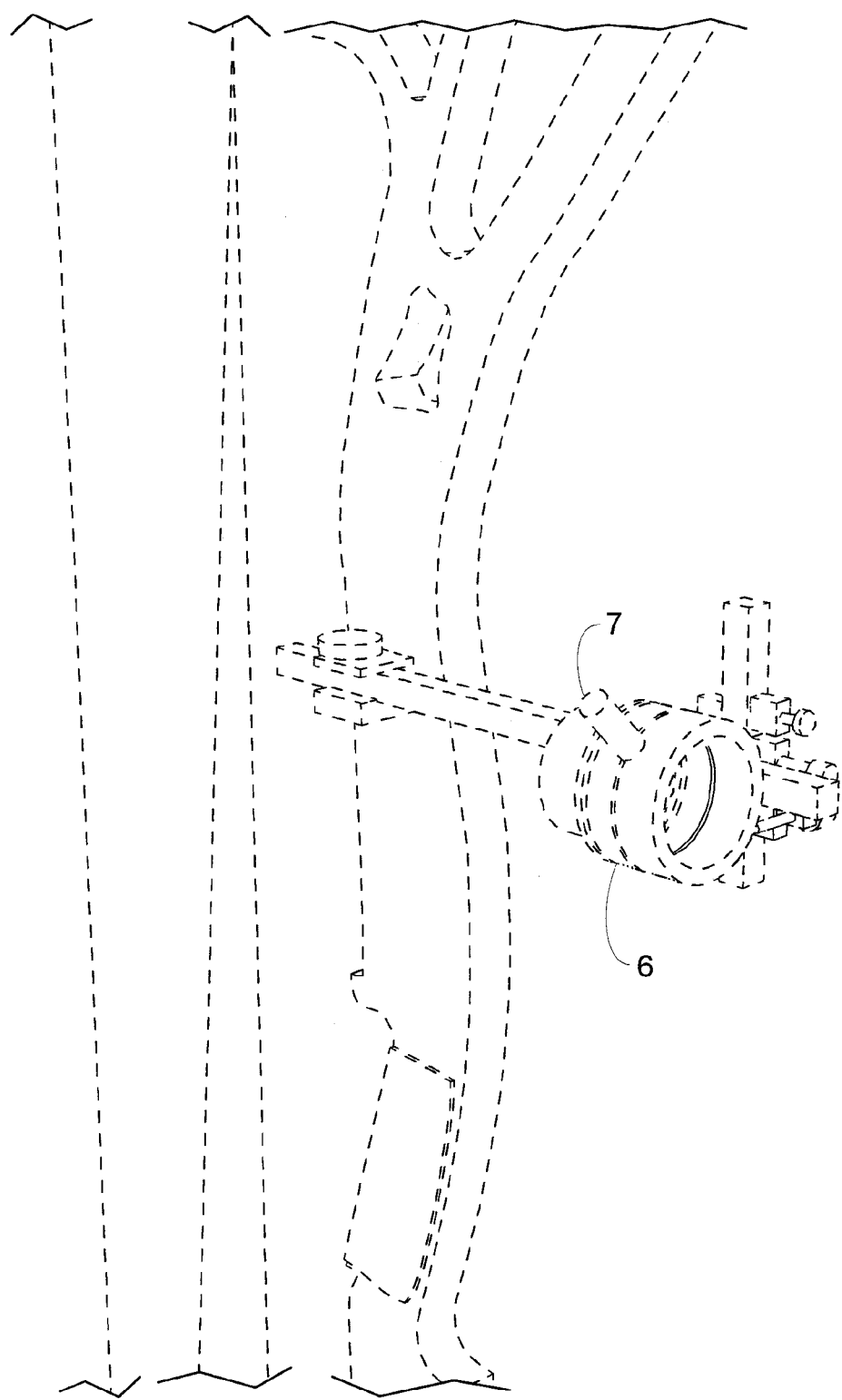
FIG. 1 depicts a perspective rear view of a representative sample of a lens of the invention disclosed herein, anchored within a representative sample of a sighting scope housing (in dashed lines).
Figure 2:
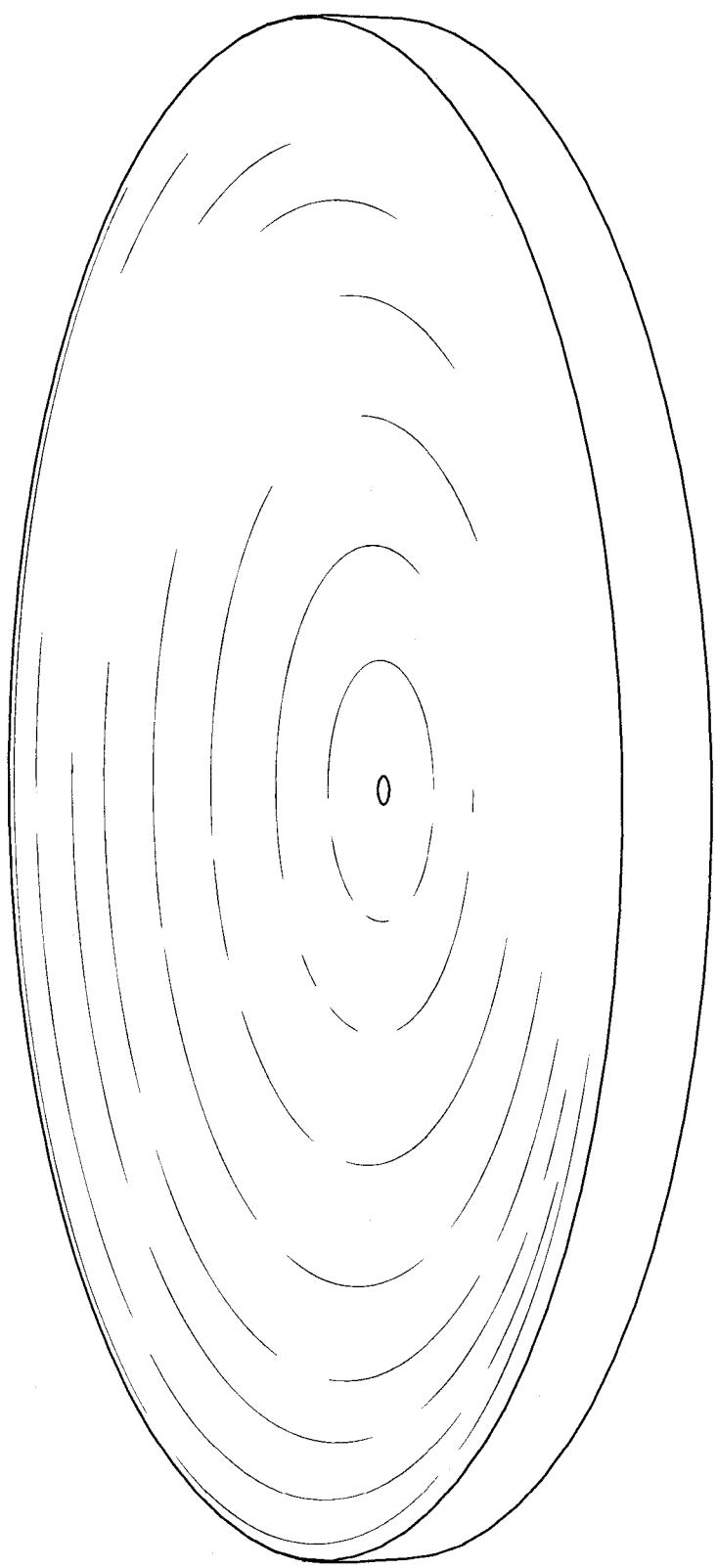
FIG. 2 depicts a perspective rear view of the lens of FIG. 1, at an angle showing the indentation in the concave surface of the lens.
Figure 3:
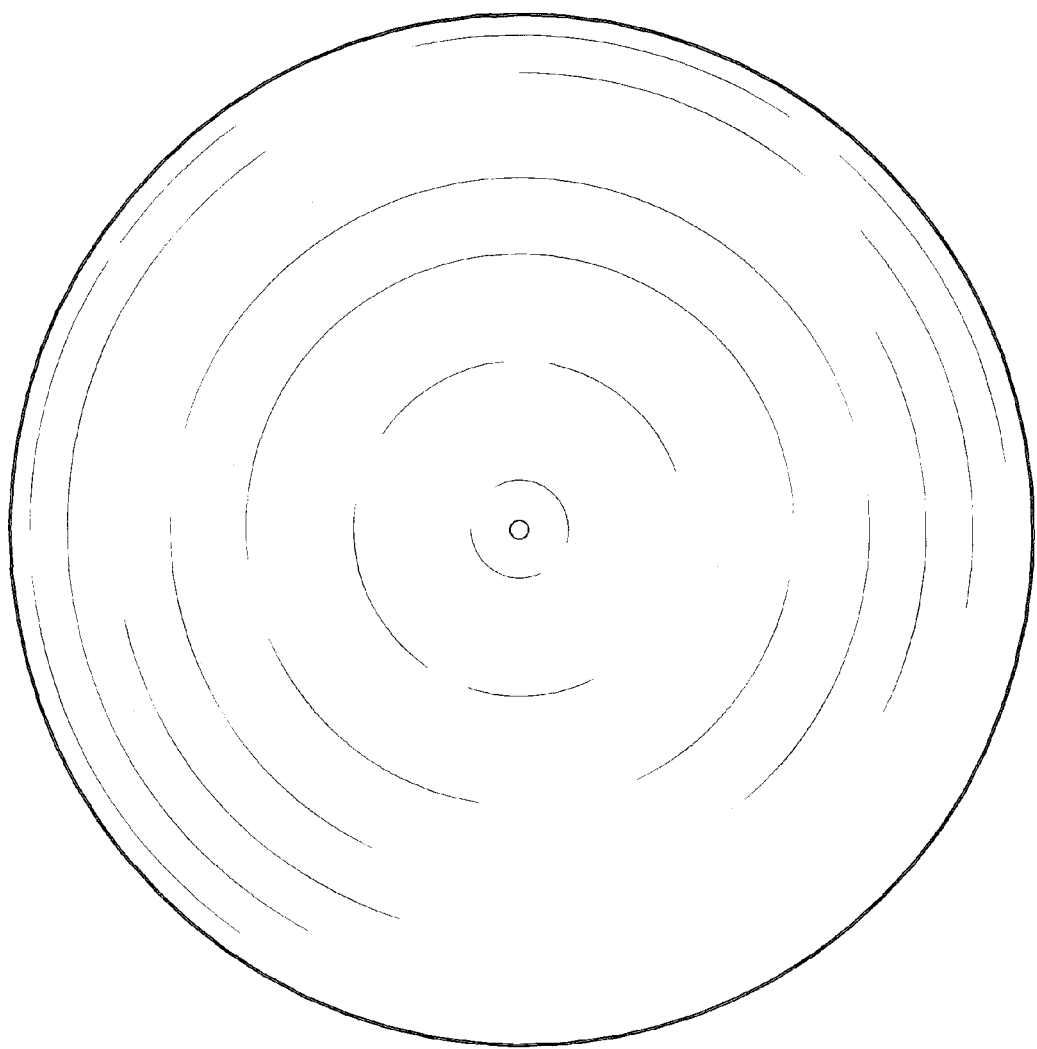
FIG. 3 depicts a rear elevation view of the lens of FIG. 1.
Figure 4:
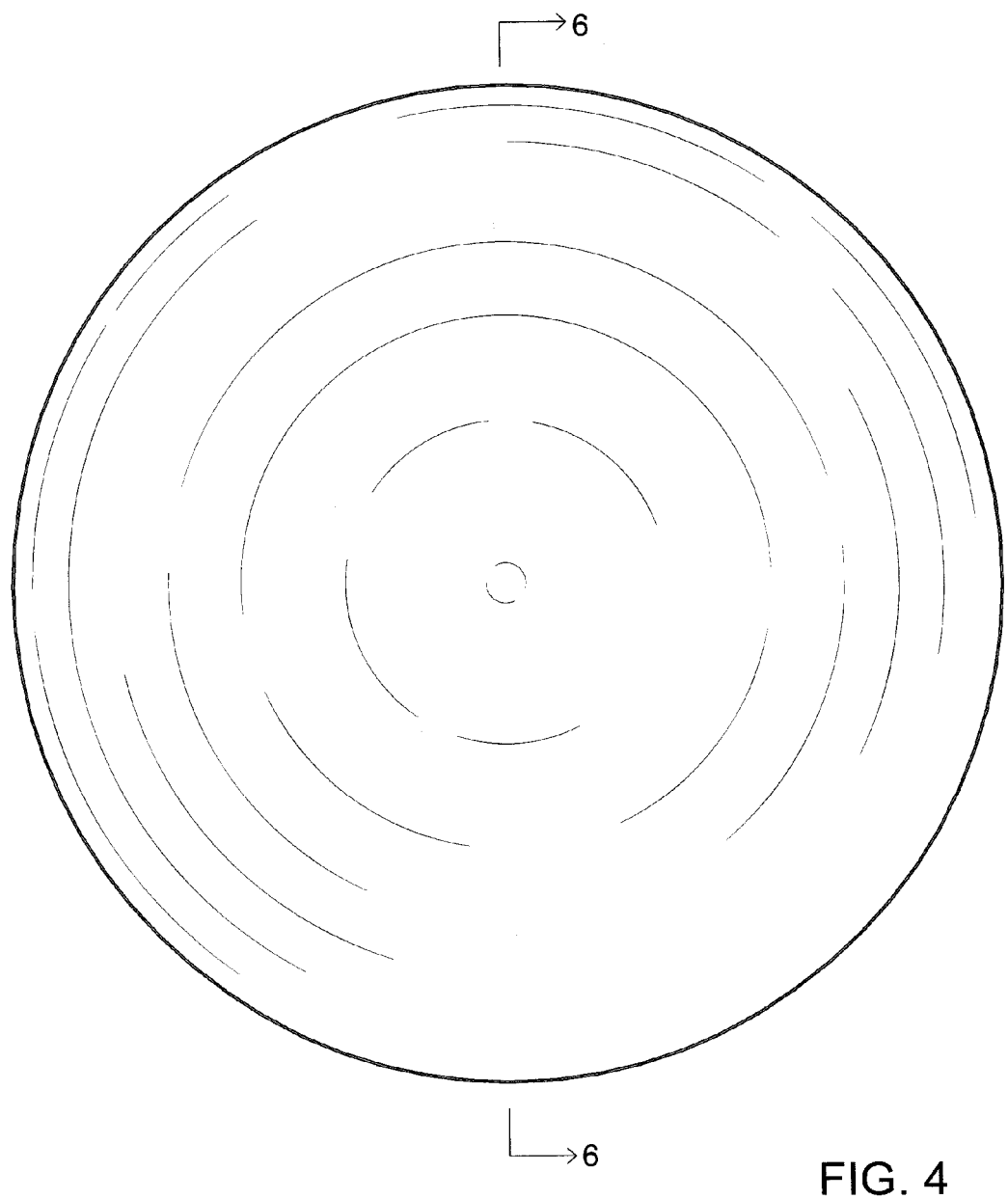
FIG. 4 depicts a front elevation view of the lens of FIG. 1.
Figure 5:
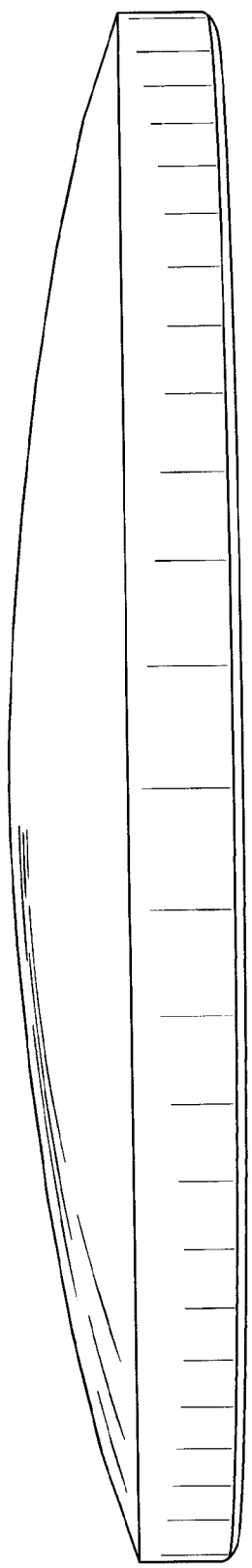
FIG. 5 depicts a side elevation view of the lens of FIG. 1; all other side elevation view appear identical.

The broken lines are for illustrative purposes, and may not form part of the claimed invention.

DETAILED DESCRIPTION OF THE INVENTION

The phrase "optical center" means a point on the axis of a lens that is so located that any ray of light passing through it in passing through the lens suffers no net deviation and that may be within, without, or on either surface of the lens.

The terminology used herein is for the purpose of describing particular embodiments only, and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element.

The disclosure herein is not limited by construction material(s) to the extent that such materials satisfy the structural and/or functional requirements. For example, any material may be used so long as it satisfies the rigid structural and optical functional requirements for which it is being used. In one embodiment, the lens is polycarbonate; however, other optical material of sufficient rigidity will suffice as well, if it is possible and practical for such material to support or embody the modification(s) needed to accomplish the function of the invention.

It is an object of the present invention to provide a sighting device that will assist the user to more accurately aim at a target object.

Another object of the invention is to provide a sighting device that facilitates such accurate aiming in a variety of light conditions.

Another object of the invention is to provide a sighting device that facilitates such accurate aiming with or without the assistance of artificial light.

Yet another object of the invention is to rid the archer of the sight pin or bars known in the art, that obstruct the field of view of the target while the archer is aiming the bow.

Other objects of the invention will become clear upon a review of the disclosure herein.

In the embodiment illustrated in FIG. 1, the lens is an optical device facilitating more accurate aiming at a target object. Although circular, the lens can be almost any other shape so long as the optical center is near the geometric center (preferably), and it can be coupled with an archery bow or any other hunting or targeting apparatus which requires or facilitates aiming. Typically a disk shaped lens will have a diameter in the range of between about 1 and 2 inches, depending upon the user and usage, and/or the specifications required for anchoring within a housing. Preferably the diameter range will be about one and three-eighths ($1\frac{3}{8}^{th}$) to about one and three-quarters ($1\frac{3}{4}^{th}$) inch, although other ranges or values of diameters are acceptable. The device may include two primary components; the lens having the glowable substance deposited therein; and a housing or frame within which the lens is anchored. The apparatus may also include an independent light source, mostly for illuminating the peripheral edge of the lens, rather than the primary planar surface(s). As shown in FIG. 1, the lens has its peripheral edge anchored within a frame. Ideally the lens is a meniscus lens, one primary planar side (typically the side the user peers at and through) having a concave curvature; the other primary planar side has a convex curvature, typically complementary to the concave side.

Both primary planar sides of the lens are covered with one or more anti-reflective coating(s). However, in this invention there is a second utility to the anti-reflective coating(s), besides decreasing the reflection of (and glare associated with) light waves striking a primary planar side of the lens. It is believed that the anti-reflective coating increases or facilitates the within-lens transmission of light directed at an uncoated portion of the peripheral edge of the lens.

The uncoated peripheral edge of the lens is illuminated by an independent light source (7). In one embodiment, the light source shines light upon the peripheral edge (5) of the lens, there being a space between the lens and the light source. Alternatively, the light source may contact the lens. The light source typically is housed within a hollow housing (6), usually tubular, having one end connected to the lens frame adjacent the peripheral edge of the lens. The placement of the light source inside the tube concentrates and directs the light beam in the direction of the uncoated peripheral edge of the lens, increasing the amount of light to excite the substance within the indentation within the lens.

Figure 6:
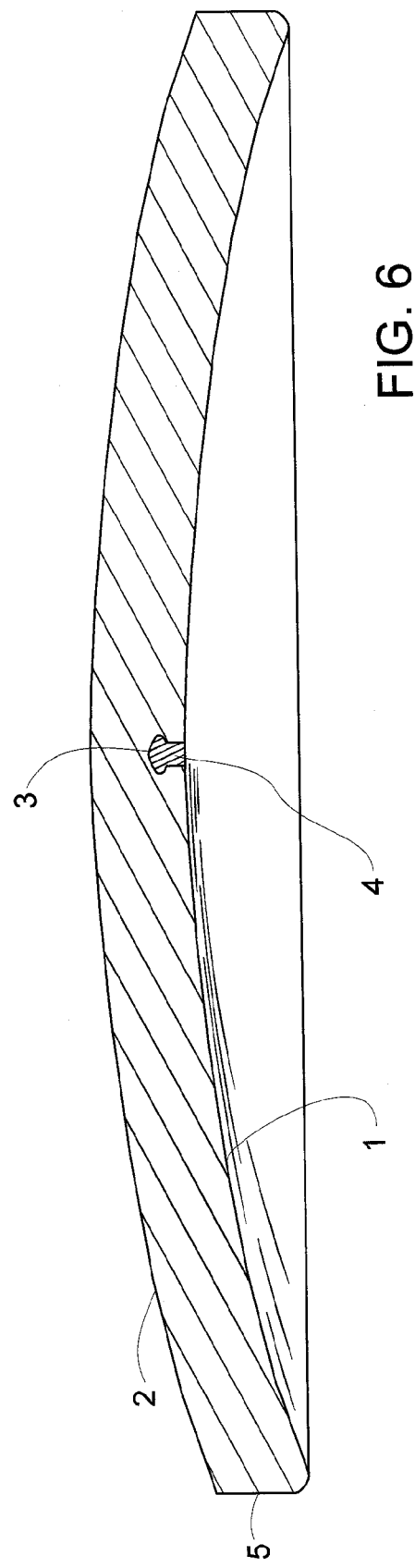
FIG. 6 depicts a cross-section view of the lens of FIG. 1, at plane 6-6 of FIG. 4.
Figure 7:
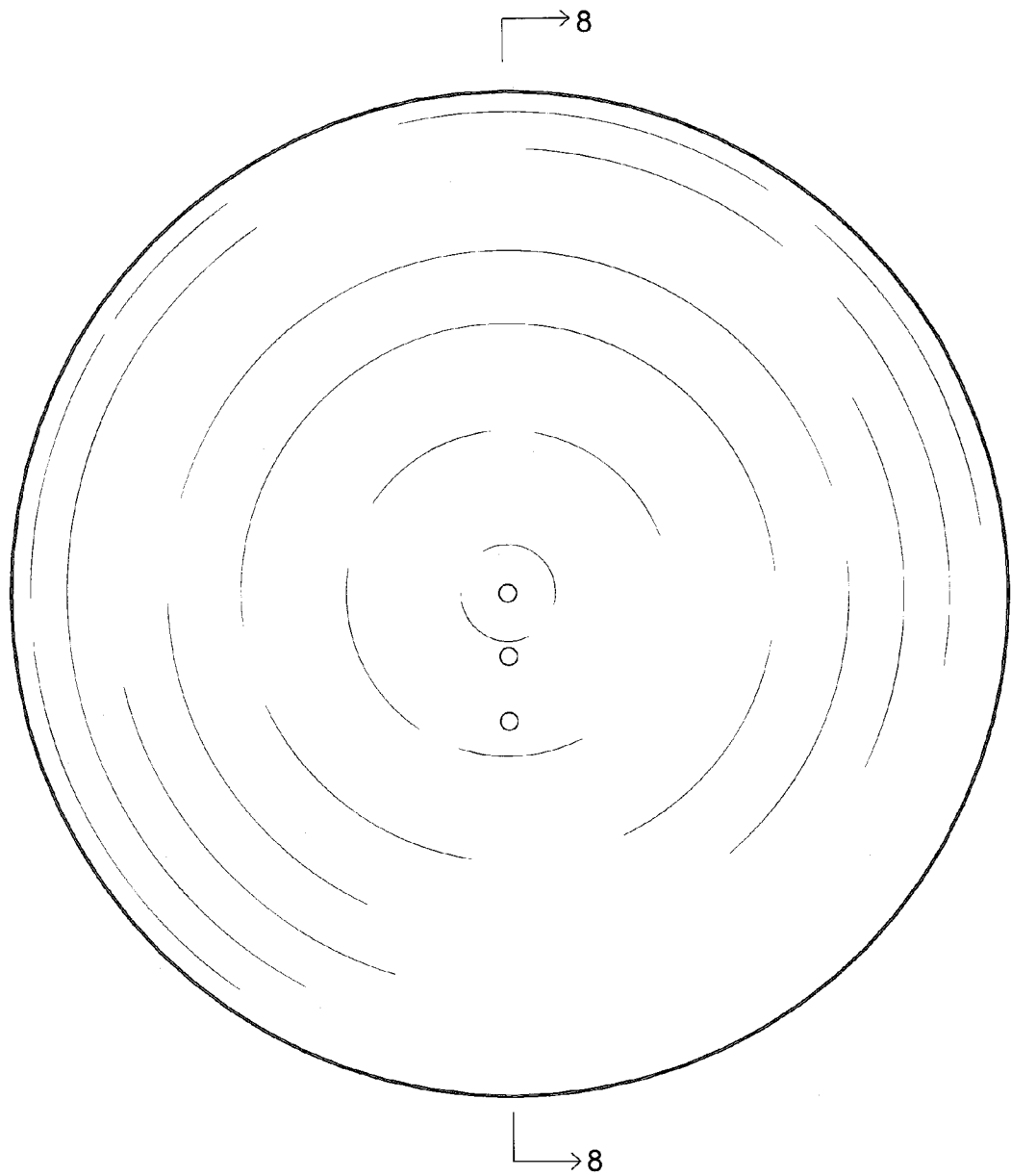
FIG. 7 depicts a rear elevation view of the 3-recitle Range version of the lens.
Figure 8:
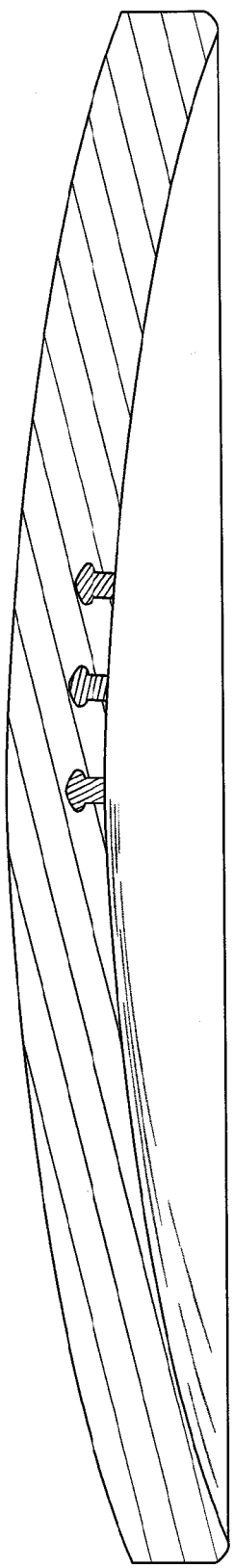

As is shown in FIG. 6, which depicts a cross-section view of a representative sample of the lens, ideally the lens has a concave side (1) and a complimentary convex side (2). In this example, the cavity (3) is burred into the concave side, although other embodiments may include one or more cavity(ies) burred into the convex side. The cavity is filled with a glowable substance (4), preferably having a fill-line at or below the lens plane defining the access opening. The lens also includes a peripheral edge (5).

The optical center of the lens is also the geometrical center. The indentation (or widest cavity portion) may have a diameter of whatever length needed to provide, when filled with glowable substance, whatever size of glowable reticle is necessary or desired. Typically, the fluorescent compound (marker) occupies most if not all of the cavity space of the indentation. Typically the reticle, or viewable "spot", will have a diameter in the range of between about 0.25 mm up to about 1.25 mm, although another diameter (or range) may be acceptable depending upon the user and usage.

The disclosed invention may include a plurality of additional indentations (or cavities) periodically spaced from the indentation at the optical center, with each additional indentation receiving a substance made glowable by the light source and/or ambient natural light. Although the indentations or cavities may be arranged in any configuration, preferably they may be spaced in vertical linear alignment. Preferably the additional indentations or cavities (or reticles) are aligned beneath the indentation at the optical center, they could be aligned both beneath and above that at the optical center; and there is no requirement that there be a reticle at the optical center. There is no requirement that all the reticles of a lens have the same size, shape or diameter. The precise dimensions, coloration and other characteristics may depend upon the user and the usage. In one example, all three reticles are 1 mm in diameter, with the distance between the center point of reticle 1 (the center point of the disk) and the center point of reticle 2 (beneath reticle 1) is 2.5 mm. The distance between the center point of reticle 2 and the center point of reticle 3 is 2.5 mm.

Activation of the independent light source directed to the peripheral edge of the lens causes illumination of the fluorescent compound inside the indentation (and within the lens). Ideally the wavelength of light will be selected to optimize the glowing of the substance within the cavity. Wavelengths producing a white LED light work particularly well with the substances/compounds identified herein.

Typically, making the lens begins with a fully coated (front and back) anti-reflective meniscus high grade optical quality polycarbonate lens in plano, +0.25, +0.50, +0.75, +1.00 powers. The following steps are typically employed.

Step 1—Verification of the power of the lens and identification of the true optical center. This is performed with the use of a lensometer.

Step 2—Secure the lens with an adhesive pad and block so that it can be shaped by the lens edger to the appropriate size.

Step 3—Lens size and shape is set in the edger. It may vary, depending upon the model of scope housing used in combination with the lens.

Step 4—The lens is placed in the edger. It is held in the correct position by the block (step 2) and secured by a chuck device.

Step 5—The edger then precisely shapes the lens to the appropriate size, leaving the true optical center as now the exact geometric center of the lens. Once out of the edger, the block is removed, and once again the center is marked.

Step 6—The outer edge of the lens is then marked on the front surface with identification marks of the scope manufacture, and power of the lens in diopters.

Step 7—Each lens is then inspected for any defects.

Step 8—Each lens passing quality control is then ready for the insertion of the reticle. Under magnification, the optical center is burred with a burring tool to approximately 1 mm in depth on the concave surface (inside) of the lens. The overall center lens thickness varies with lens power, but the range is approximately 1.97 to 2.20 mm.

Step 9—A smaller angled burr tool is then inserted down the previously burred opening. The bottom of the original cavity is burred larger, resulting in a bell shaped bottom in the cavity of the lens.

Step 10—All debris is removed with compressed air that is discharged into the cavity in the lens.

Step 11—Poly monomer is then inserted into the burred bell bottom cavity in the lens using a fluorocarbon fiber strand, still under magnification. The entire cavity is filled with monomer.

Step 12—The poly monomer is then cured using an ultraviolet light source for 2 minutes.

Step 13—The lens is then cleaned and inspected.

Variations of the lens are as follows: Burr size (A) 0.64 mm (B) 1 mm (C) 1.3 mm (D) 1.75 mm.

Different material(s) may be used for the glowing substance, some requiring only ambient light to glow while others are capable of using artificial light. And hues of various opaque, florescent and luminescent colors may be used. The glowable substance can be essentially any substance that emits light upon or after exposure to light. Most such photoluminescent substances are primarily fluorescent or phosphorescent. Examples of acceptable materials include: Di-Hema Trimethylhexyl, Dicarbamate, Sucrose Benzoate, Tetrahydrofurfuryl Methacrylate, HEMA, Hydroxycyclohexyl Phenyl Ketone, Ethyl Trimethylbenzoyl, Phenylphosphinate, Benzoyl Isopropanol. May Contain: Polyethylene Terephthalate, Acrylates Copolymer, Polyester-3, Silica, Mica, Aluminum Powder (Cl 77000), Blue 1 (Cl 42090), Bismuth Oxychloride (Cl 77163), Carmine (Cl 75470), Ext. Violet 2 (Cl 60730), Green 3 (Cl 42053), Green 6 (Cl 61565), Iron Oxides (Cl 77491), Iron Oxides (Cl 77492), Iron Oxides (Cl 77499), Orange 5 (Cl 45370), Red 6 (Cl15850), Red 7 (Cl 15850), Red 21 (Cl 45380), Red 22 (Cl 45380), Red 28 (Cl 45410), Red 34 (Cl 15880), Titanium Dioxide (Cl 77891), Yellow 5 (Cl 19140), Yellow 5 Lake (Cl 19140), Yellow 6 Lake (Cl 15985), Yellow 11 (Cl 47000), Ultramarines (Cl 77007), and Violet 2 (Cl 60725).

One embodiment has multiple targeting dots or "stars" that are arranged in a vertical line pattern for varying target distances.

One general embodiment comprises a lens for a sighting device with the assistance of a light source, the lens including opposing forward and rearward planar sides, a peripheral edge and an optical center area, both sides may have anti-reflective coating deposited thereon, one of the sides including an indentation at the optical center area and receiving a substance excited and made more visible by light directed onto the peripheral edge. Typically such substance is fluoresced by the light source, causing the substance to appear to glow, typically with a color.

The peripheral edge, where the light is directed onto the edge, may have a plane essentially perpendicular to the primary planar sides. It is believed that cutting the periphery off of a fully coated lens (initially having anti-reflective coating on all outer surfaces), at an angle essentially perpendicular to the primary planar sides of the lens (and essentially parallel to the direction of the light beam), facilitates and increases the entry of light into the lens edge; alternatively to (or in conjunction with) the cutting of the periphery off of a fully coated lens, polishing the lens edge upon which the light will be directed likewise facilitates and increases the entry of light into the lens edge.

Ideally the indentation is situated on the rearward side of the lens, typically the side the user peers through to aim. That puts the glowing substance closest to the user's unobstructed view; if the cavity opening was on the convex side of the lens, it would be necessary for the user to peer through the lens material forming the bottom of the bell-bottomed cavity. Moreover, the rearward side is less likely to be compromised by sight-obstructing condensation, or impacted by obstacles such as sticks, spattering of mud or debris, or other material often encountered in the field or under use conditions.

Preferably the lens is a meniscus lens, including opposing forward convex and rearward concave planar sides, a peripheral edge essentially perpendicular to the sides, and an optical center area at the geometric center of the sides. And both sides may have anti-reflective coating deposited thereon, the concave side including (at the optical center) an indentation area having an opening narrower than the remainder and receiving a fluorescent substance fluoresced by the light source directing light onto the peripheral edge. As previously noted, the edge may be polished as well.

The fluorescent substance may include a polymonomer cured by ultra violet light. The fluorescent substance may also include a substance absorbent of ambient light, causing it to glow for a material duration thereafter. This is especially useful in states or political subdivisions prohibiting the use of artificial light in hunting or sighting devices. Typically such substance may be fluorescent or phosphorescent. This is useful for hunting in jurisdictions prohibiting the use of artificial lighting in sighting devices.

One specific embodiment comprises a lens for a sighting device with the assistance of a light source, the lens including: (a) opposing forward convex and rearward concave planar sides, (b) a peripheral edge essentially perpendicular to the sides, and (c) an optical center area at the geometric center of the sides, (d) both sides having anti-reflective coating deposited thereon, (e) the concave side including at the optical center an indentation area may have an opening narrower than the remainder, (f) receiving a fluorescent substance fluoresced by the light source directing light onto the peripheral edge, and connected to a hunting device with a frame. The lens edge accepting the light may be polished. The fluorescent substance may include a polymonomer cured by ultra violet light. The fluorescent substance may further include a phosphorescent substance absorbent of ambient light and fluorescing for a material duration thereafter.

Besides the stand-alone lens, the invention disclosed herein may include a lens in combination with a sighting device. The following steps are representative of the assembly of a representative sample of such a combination apparatus.

A. Remove the scope housing retainer ring or bezel.

B. Place the lens inside the scope housing with the convex side facing away from the eye of the archer or other user.

1. LED indirect white light. The scope retainer ring and or bezel is reattached to the scope housing and tightened. This step is to securely hold the lens in the scope housing. The lens is placed in the scope housing such that the white LED light source (if available) is shining on the polished edge of the lens. Note, because the LED light is only shinning on the polished edge of the lens, the light transmits through the lens. Because of the non-glare effect of the anti-reflective coating on the lens front and back, the archer does not see the light traveling in from the polished flat edge of the lens. The LED light travels through the lens, then strikes the poly monomer (cured to a hard state that reflects its color) resulting in the "suspended star" reticle. After testing it was determined that a white LED light with a 4500 k-5000 k rating produced the best reflectivity.

2. Back illumination. Alternative method of illuminating the reticle is by direct illumination to the back of the lens, resulting in only the "star" being lit. The anti-reflective property of the lens virtually eliminates glare being seen on the lens from the light source.

3. Use of only ambient room illumination. Because virtually all glare is removed as a result of the fully coated anti-reflective coating, the "star" is visible with no artificial light source. In this instance it may be desired to use one of the luminescent "stars". In some U.S. states, bow hunters are prohibited from using any electric devices or lights on their bow.

Testing was performed on all three methods of illumination and it was determined that the white LED illumination of the polished edge provided the best results. The rear illumination performed very well, and while the external light source was preferred, the ambient illumination was still able to provide a better reticle source than that of the traditional pin.

In use, after mounting the lens-carrying apparatus to the archery bow or other instrument requiring sighting, the user turns on the light source and peers through the lens to align the target with whatever reticle is desired.

Because of not having to have the pins or shafts to hold the sight dot or fiber optics strand, the archer's target viewing area is larger, resulting in:

a. Less distraction to the archer, allowing better concentration on the target;

b. Less obstruction of their view, making it safer for the shooter in the event that a "non target" moves into the archer's shoot path. Blind spots are greatly reduced.

We claim:

1. A lens for a sighting device, in combination with a light source, said lens comprising opposing forward convex and rearward concave planar sides, a peripheral edge essentially perpendicular to said sides, and an optical center area at the geometric center of said sides, both sides having anti-reflective coating deposited thereon, said concave side including at said optical center a cavity having an opening narrower than the remainder and receiving a substance made glowable by said light source directing light onto said peripheral edge.

2. A lens described in claim 1 above, said edge being polished.

3. A lens described in claim 1 above, said substance comprising a photoluminescent substance.

4. A lens described in claim 3 above, said substance further comprising a polymonomer cured by ultra violet light.

5. A lens described in claim 3 above, further comprising a photoluminescent substance made glowable by ambient light and glowing for a material duration after exposure thereto.

6. A lens described in claim 1 above, said light source having a wavelength in the range of white LED lighting.

7. A lens in combination with a sighting device and a light source, said lens comprising opposing forward convex and rearward concave planar sides, a peripheral edge essentially perpendicular to said sides, and an optical center area at the geometric center of said sides, both sides having anti-reflective coating deposited thereon, said concave side including at said optical center a cavity having an opening narrower than the remainder of said cavity, receiving a fluorescent substance fluoresced by the light source directing light onto said peripheral edge.

8. A lens described in claim 7 above, said edge being polished.

9. A lens described in claim 7 above, said fluorescent substance comprising a polymonomer cured by ultra violet light.

10. A lens described in claim 9 above, further comprising a phosphorescent substance made glowable by ambient light and glowing for a material duration after exposure thereto.

11. A lens described in claim 7 above, said light source having a wavelength in the range of white LED lighting.

* * * * *